(12) United States Patent
Desvergne-Bleneau et al.

(10) Patent No.: US 7,875,210 B2
(45) Date of Patent: Jan. 25, 2011

(54) ADHESIVE COMPOSITE MATERIAL WITH CONTROLLED RESISTIVITY

(75) Inventors: Sandra Desvergne-Bleneau, Le Versoud (FR); Adrien Gasse, Grenoble (FR); Adam Pron, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 194 days.

(21) Appl. No.: 12/043,441

(22) Filed: Mar. 6, 2008

(65) Prior Publication Data

US 2008/0251766 A1 Oct. 16, 2008

(30) Foreign Application Priority Data

Mar. 7, 2007 (FR) .................................. 07 53690

(51) Int. Cl.
 *H01B 1/20* (2006.01)
 *C09J 163/00* (2006.01)
(52) U.S. Cl. ...................................... 252/500; 156/330
(58) Field of Classification Search ................. 252/500; 528/210–214; 156/327, 330
See application file for complete search history.

(56) References Cited

U.S. PATENT DOCUMENTS

| 4,025,463 | A |   | 5/1977  | Trevoy                      |
|-----------|---|---|---------|-----------------------------|
| 5,198,153 | A | * | 3/1993  | Angelopoulos et al. 252/500 |
| 5,416,155 | A |   | 5/1995  | Aladenize et al.            |
| 5,645,764 | A | * | 7/1997  | Angelopoulos et al. 252/500 |
| 5,662,833 | A |   | 9/1997  | Laakso et al.               |

FOREIGN PATENT DOCUMENTS

| EP | 0 280 173 A2 |   | 8/1988 |
|----|--------------|---|--------|
| EP | 0 280 173 A3 |   | 8/1988 |
| JP | 408092542    | * | 4/1996 |
| WO | WO 98/04516  |   | 2/1998 |

OTHER PUBLICATIONS

Yang et al "Preparation of Conductive Polyaniline/Epoxy Composite", Polymer COmposites 27(2), 201-204, Mar. 2006.*
Pelota et al "Epoxy adhesives made with inherently conducting polymers", Adhesives Age 39(5) pp. 18-21 1995.*
Mari Tiitu, et al., "Aminic epoxy resin hardeners as reactive solvents for conjugated polymers : polyaniline base/epoxy composites for anticorrosion coatings", Polymer, vol. 46, 2005, pp. 6855-6861.
W. Jia, et al., "Electrically conductive composites based on epoxy resin with polyaniline-DBSA fillers", Synthetic Metals, vol. 132, 2003, pp. 269-278.
Xiaojun Yang, et al. "Synthesis of conductive polyaniline/epoxy resin composites: doping of the interpenetrating network", Synthetic Metals, vol. 142, 2004, pp. 57-61.

(Continued)

*Primary Examiner* — Mark Kopec
(74) *Attorney, Agent, or Firm* — Oblon, Spivak, McClelland, Maier & Neustadt, L.L.P.

(57) ABSTRACT

The invention relates to a composite polymer material comprising an adhesive resin matrix and an electrically-conductive filler that consists of an oligoaniline in an electrically-conductive form comprising from 4 to 30 repeat units and present in an amount ranging from 15 to 40% by weight relative to the total weight of the material, said material having a resistivity ranging from $10^5$ to $10^7$ $\Omega$.cm.

21 Claims, 2 Drawing Sheets

OTHER PUBLICATIONS

A.V. Ragimov et al., "Thermal stability of block copolymers of oligophenyleneamine with bisphenol A epoxy resin", Chemical Abstracts, vol. 54, No. 2, XP-002469410, 1961, Plasticheskie Massy, 1 page.

M. Jozefowicz, et al., "Conductivité Electronique et Propriétés Chimiques de Polyanilines Oligoméres", Journal of Polymer Science: Part C, No. 16, XP 008088834, 1967, pp. 2943-2954, with English abstract.

R.K. Gupta, et al., "Preparation and characterization of polymer composites of polyaniline with poly(vinyl chloride) and polystyrene" Journal of Non-Crystalline Solids, vol. 351, No. 24-26, XP 004970214, 2005, pp. 2022-2028.

* cited by examiner

ADHESIVE COMPOSITE MATERIAL WITH CONTROLLED RESISTIVITY

TECHNICAL FIELD

The present invention relates to a composite polymer material having adhesive properties and an electrical resistivity ranging from $10^5$ to $10^7$ Ω.cm.

These materials may especially be used as anti-static coatings, for example, in electromagnetic shielding or as a material for surface interconnection of electronic components.

PRIOR ART

Many documents in the prior art describe composites that have adhesive properties and electrical properties.

Generally, the mixtures are prepared by dissolving adhesive compounds in a dispersion of polyaniline followed by evaporation of the solvent and crosslinking of the matrix.

Thus, Tiitu et al., in *Polymer* 46 (2005), pages 6855-6861, have developed a composite for an anti-corrosion coating obtained by a method that comprises the following steps:

a step of mixing a polyaniline in emeraldine base form with an amine acting as a hardener (such as, N,N,N',N'-tetrakis(3-aminopropyl)-1,4-butanediamine or trimethylhexanediamine); and a step of crosslinking the mixture obtained by adding a bisphenol A diglycidyl ether type epoxy resin.

This results in a dedoping phenomenon of the polyaniline due to the use of an amine hardener of the aforementioned type and also an inhomogeneous material due to problems of miscibility between the polyaniline and the epoxy resin, which material thus has conduction properties that are not very reliable and are not reproducible. Finally, the evaporation of the solvent during the implementation accentuates the poor miscibility of the polyaniline in the epoxy resin.

Document U.S. Pat. No. 5,416,155 describes a material used, in particular, in the field of screen printing that comprises an insulating polymer and a non-doped or dedoped conjugated polymer such as a polyaniline and optionally a mineral filler, thermoplastic polymers and thermosetting polymers, such as epoxy resins. This material is also faced with a problem of miscibility between the polyaniline and the epoxy resin.

In order to solve the problems linked to dedoping, some authors have thought to work with an excess of dopants.

Another solution consists in using a dopant for the polyaniline that also acts as a crosslinking agent in order to form the epoxy resin matrix.

Thus, U.S. Pat. No. 5,662,833 describes a thermoset composition comprising a polyaniline protonated with a phosphonic acid comprising at least one hydroxyl group in excess and a matrix resulting from the crosslinking of a resin, such as a phenol-formaldehyde resin, a melamine-formaldehyde resin or a polyethylene resin. However, in this document, the compositions described have a very large change in their resistivity as a function of the amount of polyaniline, which makes it difficult to control the properties of these compositions. Furthermore, the use of an excess of protonic acid is unfavourable both from an environmental viewpoint and from a technological viewpoint. This is because the diffusion of the molecules in excess may result in a modification of the properties over time.

Jia et al., in Synthetic Metals, 132, (2003), 269-278, describe a material comprising a matrix resulting from the crosslinking of an epoxy resin with a crosslinking agent of the carboxylic acid anhydride type and a dispersed polymeric filler based on polyaniline and a dopant of the dodecylbenzenesulphonic acid type. This material does not have sufficient stability to allow control in an intermediate resistivity zone. Furthermore, this crosslinking agent requires a crosslinking temperature of around 140° C.

Whatever the method of production, there remains, in the materials produced, problems of inhomogeneity due to the low miscibility of the polyaniline in the resins forming the matrix, a problem of dedoping of polyaniline and also a difficulty in obtaining materials that have an intermediate resistivity ranging from $10^5$ to $10^7$ Ω.cm, which does not enable these materials to be used in fields that require these resistivities.

SUMMARY OF THE INVENTION

The inventors have set themselves the objective of solving the problems mentioned above and especially the problems of miscibility between polyaniline and the matrix based on an adhesive resin and having an intermediate resistivity ranging from $10^5$ to $10^7$ Ω.cm.

Thus, the invention relates to a composite polymer material comprising an adhesive resin matrix and an electrically-conductive filler that consists of an oligoaniline in an electrically-conductive form comprising from 4 to 30 repeat units, said oligoaniline being present in an amount ranging from 15 to 40% by weight relative to the total weight of the material, said material having a resistivity ranging from $10^5$ to $10^7$ Ω.cm.

It is specified that the resistivity is determined by the 4-point technique such as explained in the experimental section.

It is specified that the expression "repeat unit" is understood to mean the structural unit comprising a phenyl ring and a nitrogen atom.

The oligoaniline must be in an electrically-conductive form, this form conventionally being obtained by the addition of a dopant.

One of the envisageable forms of oligoaniline is the emeraldine form, in which the number of nitrogen atoms set in an imine functional group is equal or close to the number of nitrogen atoms set in an amine functional group, this form being protonated by the addition of a dopant in order to render it electrically conductive.

One oligoaniline that can be envisaged is the aniline tetramer, which has 4 aniline repeat units in accordance with the formula below:

the above tetramer being rendered electrically conductive by protonating with a dopant.

Oligoanilines, due to their low molecular weight, allow a better miscibility in the adhesive resin matrix and make it possible to attain materials that have a resistivity in the range of $10^5$ to $10^7$ Ω.cm.

Particularly suitable adhesive resins are epoxy resins, which result from the polymerization of one or more prepolymers comprising an epoxy unit (subsequently referred to as an epoxy prepolymer), which forms a polymerizable unit, the polymerization taking place, for example, with a crosslinking agent of the Lewis acid type complexed with an organic compound that is an electron-pair donor. Preferably, the crosslinking agent has an activation temperature below 80° C., preferably not greater than 50° C. The expression "activation temperature" is understood to mean the temperature starting from which the crosslinking agent is able to generate crosslinking of the prepolymer. Suitable crosslinking agents are amine-Lewis acid complexes, in particular amine-BX$_3$ complexes, X corresponding to a halogen atom, such as fluorine or chlorine. A suitable crosslinking agent is chlorobenzylamine-BF$_3$.

A suitable epoxy prepolymer may be chosen from those comprising a bisphenol A unit, a bisphenol F unit, a diglycidyl ether unit and/or a novolac unit.

An example of a prepolymer comprising a bisphenol A unit is a prepolymer corresponding to the following formula:

in which n is an integer ranging from 0 to 12.

For example, when n is equal to 0, the prepolymer corresponds to bisphenol A diglycidyl ether.

An example of a prepolymer comprising a bisphenol F unit corresponds to the following formula:

also known as bisphenol F diglycidyl ether.

An example of a prepolymer comprising a diglycidyl ether unit is 1,4-butanediol diglycidyl ether corresponding to the following formula:

A suitable epoxy prepolymer may also be chosen from those comprising a novolac unit.

An example of a prepolymer comprising a novolac unit is a prepolymer corresponding to the following formula:

in which n is an integer ranging from 0 to 5.

The epoxy resin may result from the polymerization of at least two epoxy prepolymers such as defined above, for example of a prepolymer comprising a bisphenol A unit such as defined above and of 1,4-butanediol diglycidyl ether.

The oligoanilines are present in an amount ranging from 15 to 40% by weight relative to the weight of the material, which leads to being situated above the percolation threshold, in order to have an excellent reproducibility of the resistivity in a range from $10^5$ to $10^7$ Ω.cm.

It is specified that the percolation threshold corresponds to the minimum volume fraction of conductive phase to ensure the macroscopic electrical conductivity of the material.

Below an amount of 15% by weight of oligoaniline, the resistivity of the material varies greatly with the composition and is not controllable, as it is situated below the percolation threshold.

Above an amount of 40% by weight of oligoaniline, the resistivity values are too low relative to the targeted resistivity range. Furthermore, the adhesive properties are no longer ensured, as the amount of adhesive becomes too low.

The materials of the invention comprise, advantageously, one or more dopants.

Advantageous dopants which may be incorporated into the composition of the materials of the invention correspond to the following formula:

(I)

in which:

R$^1$ represents —SO$_3$H or PO$_3$H$_2$;

R$^2$ is a linear or branched alkyl group and m is equal to 1 or 2; or $R^2$ is a group of formula:

in which $R^1$ is such as defined above and n is an integer ranging from 1 to 16, and m is equal to 1.

In this formula, the group $R^2$ may be a linear or branched alkyl group preferably having from 4 to 12 carbon atoms so as to form a hydrophobic group that acts as a plasticizer and makes it possible to improve the solubility of the polyanilines in organic solvents.

By way of example of a group capable of being used, mentioned may be made, for example, of the 2-ethylhexyl group.

In the case where m is equal to 2 and $R^2$ is an alkyl group, these phosphonic or sulphonic acids correspond to esters of phthalic, isophthalic and terephthalic acids functionalized with an acid group of the —$SO_3H$ or —$PO_3H_2$ type.

In the case where m is equal to 1, these are benzoates functionalized on the aromatic ring by the aforementioned acid groups, when $R^2$ is an alkyl group, or dibenzoates also functionalized by acid groups and corresponding to the formula:

These sulphonic or phosphonic acids may be prepared from the corresponding functionalized phthalic or benzoic acids that correspond to the formula:

in which $R^1$ and m are such as defined above, via esterification of these acids using an alcohol of formula $R^2OH$ in which $R^2$ is such as defined above.

The acids of formula (IV) used as starting materials in this process are commercial products or may be prepared by sulphonation or phosphorylation of the phthalic acids or benzoic acid.

In the case where $R^2$ represents the group of formula (II) and m is equal to 1, the sulphonic or phosphonic acid may be prepared in the same way via esterification of the acid of formula (IV) with the corresponding alcohol $R^2OH$ where $R^2$ is the group of formula (II), or alternatively via condensation of two molecules of formula (IV) with m=1, with a diol of HO—$(CH_2)_n$—OH type.

The sulphonic and phosphonic acids described above have good properties as protonating agents due to the $SO_3H$ or $PO_3H_2$ group, and as plasticizers and solubilizers due to the presence of the group:

Due to the addition of such dopants, it is possible to improve the mechanical properties of the oligoanilines and in the same way that of the composite material.

This is because these dopants, besides the fact of ensuring the doping of the oligoanilines, also act as plasticizers helping to compensate for the loss of mechanical strength of the matrix induced by the presence of oligoanilines.

The invention also relates to a method for manufacturing a material such as defined above comprising the following steps:

a) a step of preparing a mixture comprising a prepolymer of the adhesive resin, an oligoaniline comprising from 4 to 30 repeat units, an organic solvent, a dopant and optionally a crosslinking agent in the form of a Lewis acid complexed with an organic compound that is an electron-pair donor;

b) a step of evaporating at least part of the organic solvent;

c) a step of adding a crosslinking agent when this is not present in step a), said agent being a Lewis acid complexed with an organic compound that is an electron-pair donor; and d) a step of crosslinking said mixture at a suitable temperature to obtain a material having a resistivity ranging from $10^5$ to $10^7$ $\Omega$.cm, the order of the steps possibly being a), b), c) and d) or a), c), b) and d), step c) not existing when the crosslinking agent is present in step a).

This method is adapted when the prepolymer coexists separately from the crosslinking agent (for example, sold by the supplier in separate compartments), in which case the crosslinking agent will be added during step c).

The prepolymer may be available as a direct mixture with the crosslinking agent, in which case step c) does not take place, the crosslinking agent being present from step a).

Due to the nature of the oligoaniline, there is a high miscibility between the oligoaniline and the prepolymer, in the same way that it is possible to use a large range of solvents.

The preparation step a) is carried out by bringing the oligoaniline and the prepolymer into contact with an organic solvent and a dopant, and optionally a crosslinking agent, when the prepolymer is already in the presence of the crosslinking agent.

The oligoaniline, the prepolymer and the dopant correspond to the same specificities as in the descriptive section relating to the material.

Preferably, the organic solvent is a solvent having an evaporation temperature below the crosslinking temperature. Advantageous solvents may be tetrahydrofuran and ethyl acetate.

The evaporation step b) is advantageously carried out at a temperature below the crosslinking temperature, for example, with stirring and in an atmosphere of a neutral gas such as nitrogen or argon. The evaporation step b) may also be carried out in the open air.

The crosslinking agent is, according to the invention, a Lewis acid complexed with an organic compound that is an electron-pair donor. This type of crosslinking agent has the advantage of being chemically compatible with the electrically-conductive form of the oligoaniline. Preferably, the crosslinking agent has an activation temperature below 80° C., preferably not greater than 50° C. The expression "activation temperature" is understood to mean the temperature starting from which the crosslinking agent is capable of generating crosslinking of the prepolymer. Suitable crosslinking agents are amine-$BX_3$ complexes, X corresponding to a halogen atom, such as fluorine or chlorine. A suitable crosslinking agent is chlorobenzylamine-$BF_3$.

Finally, the method of the invention comprises a step of crosslinking said mixture. The crosslinking temperature will be chosen so as to be at least equal to the activation temperature of the crosslinking agent and so as to obtain a material having a resistivity ranging from $10^5$ to $10^7$ $\Omega$.cm.

This crosslinking temperature is advantageously below 80° C., especially when the crosslinking agent is a chlorobenzylamine-$BF_3$ complex.

Before the crosslinking step, the method may comprise a step of depositing the mixture onto a substrate in the form of a film (for example, by simple coating, by spin coating or screen printing), having, for example, a thickness ranging from 10 to 50 μm, or in the form of discrete features such as beads, joints or arrays of studs, optionally deposited using a syringe or by screen printing.

The invention will now be described relative to the following examples given by way of illustration and non-limitingly.

DETAILED DESCRIPTION OF PARTICULAR EMBODIMENTS

The examples which follow illustrate composite materials comprising a dispersion of polyaniline (for Comparative Example 1) or of aniline oligomers, supplied by Paniplast, in a matrix that results from the crosslinking of an epoxy prepolymer supplied by Epotek.

The composite materials were produced according to the following principle.

Firstly, the epoxy prepolymer was dissolved in the dispersion of polyaniline or of oligoaniline in a solvent. The amounts for each of the constituents were calculated so as to obtain at the end, after evaporation of the solvent, the desired composition, especially the desired amount of oligoaniline that appears in the tables below.

The evaporation of the solvent was carried out with magnetic stirring so as to obtain a homogeneous mixture and optionally with moderate heating (around 40° C.) under a stream of air, nitrogen or argon.

Finally, the crosslinking agent was added in the appropriate amounts, the amounts being 1:10 for the hardener relative to the prepolymer in the case of OM 100. Mixing was carried out using a spatula for the time required to obtain a homogeneous mixture. The solvent residues were removed from the mixture.

Secondly, the mixture obtained was deposited onto a glass substrate by simple coating, the thickness of the film possibly ranging from 10 to 50 μm and being homogeneous.

Thirdly, the film was subjected to a crosslinking step, the conditions for which are explained in the tables below.

The resistivity was measured by the 4-point technique according to the following procedure.

This technique consisted in measuring the resistivity of a layer deposited on the surface by a system of 4 points arranged in line. The difference in the voltage V induced between two points during the flow of the current I between the two other points was measured. The measurement device comprised a cell having four electrical contact points, a very stable generator, an ammeter and an electronic voltmeter. The generator supplied the two outer points (electrodes) with current and the voltmeter measured the voltage generated between the two median points (electrodes) by the current passing through the sample.

The ratio ΔV/I was measured, this ratio possibly being connected to the resistivity of the material of the sample, the unit of measurement for the resistivity being, in this case, the ohm.cm. For this, it is necessary to know the thickness of the deposited layer, the thickness of the layer being measured by microscopy.

Comparative Example 1

In this example, the epoxy prepolymer was a mixture of BADGE (bisphenol A diglycidyl ether) and 1,4-butanediol diglycidyl ether and the crosslinking agent was an amine-$BF_3$ complex (these ingredients being sold under the trade name EPOTEK OM 100). In this example, the electrically-conductive polymer was a polyaniline and not an oligoaniline, supplied by Paniplast (Paniplast Sol AP1-T1) and the solvent was toluene.

Table 1 below summarizes the nature of the compositions and also the crosslinking cycle which was applied to them.

| Resin | Conductive filler | Solvent | Content of polyaniline + dopant (wt %) | Cross-linking temp. (° C.) | Cross-linking time (min) |
|---|---|---|---|---|---|
| Epotek OM 100 | Polyaniline + dopant | Toluene | 9.63 | 50 | 240 |
| | | | 19.72 | 50 | 240 |
| | | | 34.88 | 50 | 240 |
| | | | 49.42 | 50 | 240 |
| | | | 100 | 50 | 240 |

The content of doped polyaniline (polyaniline+dopant) was expressed as a percentage relative to the total weight (corresponding to the sum of the weight of resin and doped polyaniline).

Figure 1:
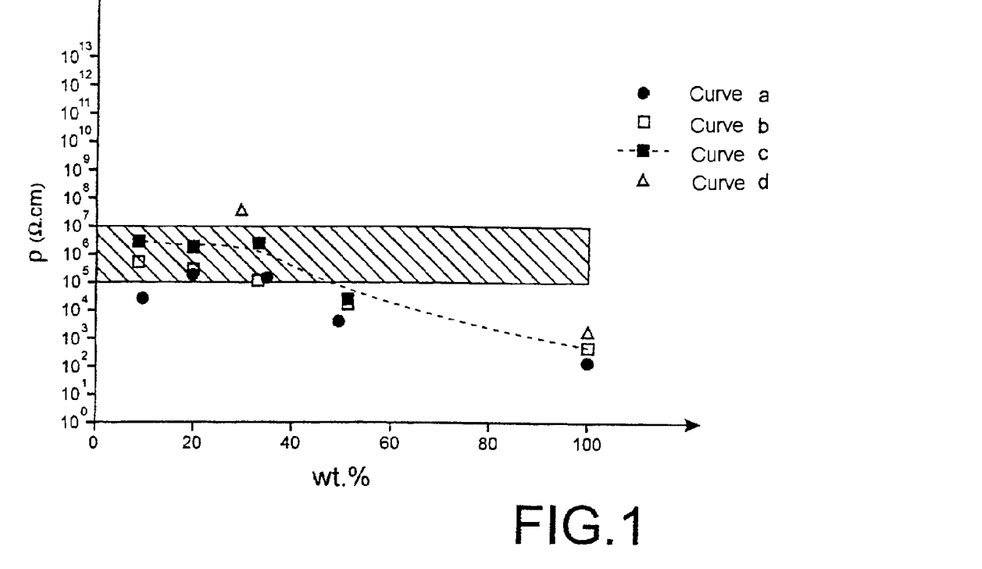
FIG. 1 represents a graph illustrating the resistivity ρ (in Ω.cm) as a function of the polyaniline or oligoaniline content (in wt %), for materials produced according to Comparative Example 1 and Example 1.

FIG. 1 represents the resistivity ρ as a function of the content of doped polyaniline in the final material. Curve a is that illustrating the results obtained with the compositions from Example 1. It can be observed that a resistivity of around $10^5$ Ω.cm is obtained for doped polyaniline contents of 19.72 and 34.88. However, encountered with the compositions of this example have been significant difficulties in evaporating the solvent before the crosslinking step and also a low miscibility between the doped polyaniline and the epoxy resin in the final material.

Example 1

In this example, the epoxy prepolymer was a mixture of BADGE (bisphenol A diglycidyl ether) and 1,4-butanediol diglycidyl ether and the crosslinking agent was an amine-$BF_3$ complex (these ingredients being sold under the trade name EPOTEK OM 100). In this example, the electrically-conductive filler was an aniline tetramer supplied by Paniplast and the solvent was tetrahydrofuran (THF).

Table 2 below summarizes the nature of the compositions and also the crosslinking cycle which was applied to them.

| Resin | Conductive filler | Solvent | % aniline tetramer + dopant (wt %) | $T_{crosslink.}$ (° C.) | $t_{crosslink.}$ (min) |
|---|---|---|---|---|---|
| Epotek OM 100 | Aniline tetramer + dopant | THF | 8.6 | 50 | 1440 |
| | | | 19.82 | | |
| | | | 33.25 | | |
| | | | 51.22 | | |
| | | | 100 | | |
| | | | 8.6 | $T_{ambient}$ | 1440 |
| | | | 19.82 | | |
| | | | 33.25 | | |
| | | | 51.22 | | |
| | | | 100 | | |
| | | | 29.73 | 80 | 1140 |
| | | | 100 | | |

The content of doped aniline tetramer (aniline tetramer+ dopant) was expressed as a percentage relative to the total weight (corresponding to the sum of the weight of resin and doped aniline tetramer).

FIG. 1 represents the resistivity ρ as a function of the content of doped aniline tetramer in the final material, the crosslinking temperatures applied being ambient temperature, 50° C. and 80° C. The curves b, c and d are those that illustrate the results obtained with the compositions from Example 1 respectively for ambient temperature, 50° C. and 80° C. It can be observed that a resistivity in the range of $10^5$-$10^7$ Ω.cm is obtained for aniline tetramer contents in the range of 15 to 40 wt % for crosslinking temperatures below 80° C. It is observed that a crosslinking temperature of 80° C. helps to increase the resistivity of the resulting material, which is outside of the desired range.

Example 2

In this example, the epoxy prepolymer was a mixture of BADGE (bisphenol A diglycidyl ether) and 1,4-butanediol diglycidyl ether and the crosslinking agent was an amine-BF$_3$ complex (these ingredients being sold under the trade name EPOTEK OM 100).

In this example, the electrically-conductive filler was an aniline tetramer supplied by Paniplast and the solvent was tetrahydrofuran (THF).

Starting from this mixture, various crosslinking cycles were imposed.

Table 3 below summarizes the nature of the compositions and also the crosslinking cycle which was applied to them.

| Resin | Conductive filler | Solvent | % aniline tetramer + dopant (wt %) | $T_{crosslink.}$ (° C.) | $t_{crosslink.}$ (min) |
|---|---|---|---|---|---|
| Epotek OM 100 | Aniline tetramer + dopant | THF | 30.12 | 50 | 55 |
| | | | | | 70 |
| | | | | | 95 |
| | | | | | 178 |
| | | | | | 1095 |

-continued

| Resin | Conductive filler | Solvent | % aniline tetramer + dopant (wt %) | $T_{crosslink.}$ (° C.) | $t_{crosslink.}$ (min) |
|---|---|---|---|---|---|
| | | | | 80 | 33 |
| | | | | | 65 |
| | | | | | 95 |
| | | | | | 178 |
| | | | | | 1095 |

The content of doped aniline tetramer (aniline tetramer+ dopant) was expressed as a percentage relative to the total weight (corresponding to the sum of the weight of resin and doped aniline tetramer).

Figure 2:
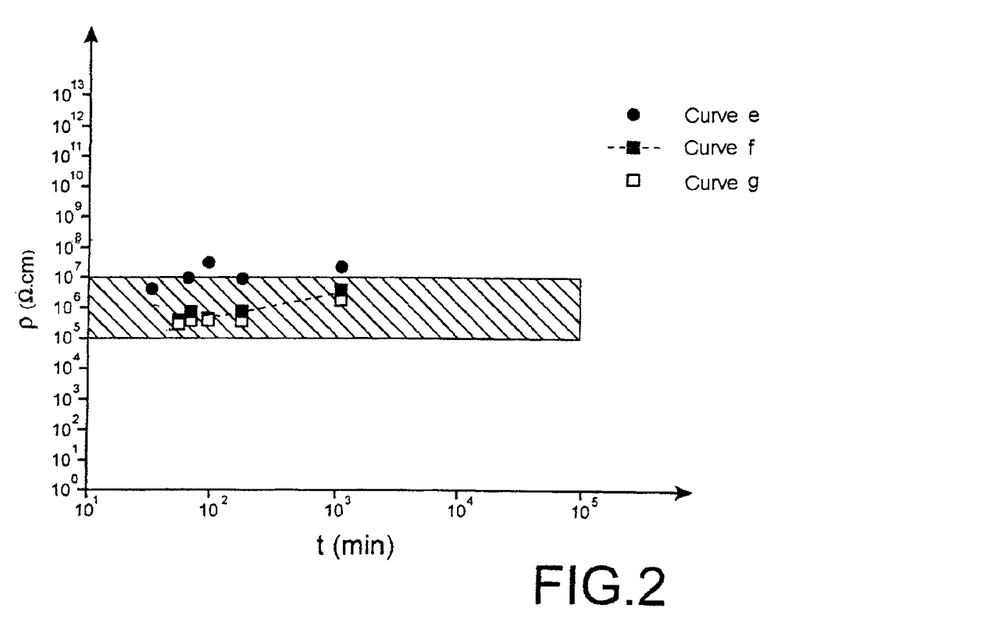
FIG. 2 represents a graph illustrating the resistivity ρ (in Ω.cm) as a function of the crosslinking time t(min) for materials produced according to Example 2.

FIG. 2 represents the resistivity ρ (in Ω.cm) as a function of the crosslinking time. It emerges from this figure that a crosslinking temperature of 80° C. induces a resistivity that is too high compared to the targeted range, namely a resistivity that ranges from $10^5$ to $10^7$ Ω.cm (cf. curve e).

As regards the crosslinking temperature of 50° C., it has been observed that increasing the crosslinking time influences the final resistivity of the material (curve f) while remaining within the desired range, the resistivity retaining a constant value over at least one week at ambient temperature (curve g). For example, a crosslinking cycle of 175 minutes at 50° C. for a composition of 30.12 wt % of doped aniline tetramer in the final material corresponds to a resistivity of 6.8×$10^5$ Ω.cm.

Example 3

In this example, the epoxy prepolymer was a mixture of BADGE (bisphenol A diglycidyl ether) and 1,4-butanediol diglycidyl ether and the crosslinking agent was an amine-BF$_3$ complex (these ingredients being sold under the trade name EPOTEK OM 100).

In this example, the electrically-conductive filler was an aniline tetramer supplied by Paniplast and the solvent was tetrahydrofuran (THF).

Two mixtures based on these ingredients were prepared.

Table 4 below summarizes the nature of the compositions and also the crosslinking cycle which was applied to them.

| Resin | Conductive filler | Solvent | % aniline tetramer + dopant (wt %) | $T_{crosslink.}$ (° C.) | $t_{crosslink.}$ (min) | $t_{rest}$ (min) |
|---|---|---|---|---|---|---|
| Epotek OM 100 | Aniline tetramer + dopant | THF | 29.73 | 50 | 55 | 0 |
| | | | | | 70 | |
| | | | | | 95 | |
| | | | | | 178 | |
| | | | | | 1095 | |
| | | | | | 37 | 50 |
| | | | | | 60 | |
| | | | | | 89 | |
| | | | | | 127 | |
| | | | | | 1077 | |
| | | | 21.68 | 50 | 40 | 0 |
| | | | | | 60 | |
| | | | | | 120 | |
| | | | | | 180 | |
| | | | | | 13140 | |

-continued

| Resin | Conductive filler | Solvent | % aniline tetramer + dopant (wt %) | $T_{crosslink.}$ (°C.) | $t_{crosslink.}$ (min) | $t_{rest}$ (min) |
|---|---|---|---|---|---|---|
| | | | | | 30 | 50 |
| | | | | | 70 | |
| | | | | | 90 | |
| | | | | | 130 | |

The content of doped aniline tetramer (aniline tetramer+dopant) was expressed as a percentage relative to the total weight (corresponding to the sum of the weight of resin and doped aniline tetramer).

Figure 3:
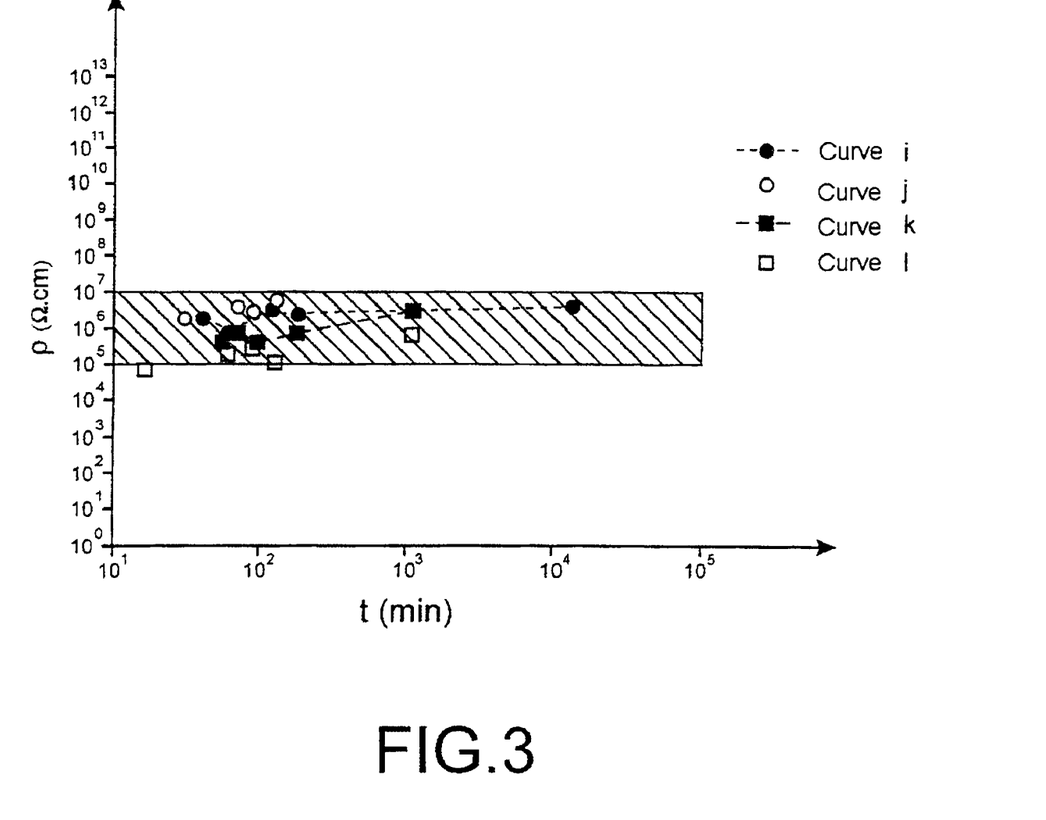
FIG. 3 represents a graph illustrating the resistivity ρ (in Ω.cm) as a function of the crosslinking time t(min) for materials produced according to Example 3.

FIG. 3 represents the resistivity ρ (in Ω.cm) as a function of the crosslinking time.

A rest time was imposed between the preparation of the mixture and its deposition and the resistivity values then obtained were compared with those of the samples deposited without a waiting time (curves i and k for respective doped aniline tetramer contents of 21.68% and 29.73% and a rest time of 0 minutes and curves j and l for respective doped aniline tetramer contents of 21.68% and 29.73% and a rest time of 50 minutes.

For both compositions, little influence of the rest time imposed is observed on the resistivity value which thus remains in the desired resistivity range.

The invention claimed is:

1. A composite polymer material comprising an adhesive resin matrix and an electrically-conductive filler that consists of an oligoaniline in an electrically-conductive form comprising from 4 to 30 repeat units, said oligoaniline being present in an amount ranging from 15 to 40% by weight relative to the total weight of the material, said material having a resistivity ranging from $10^5$ to $10^7$ Ω·cm in which the adhesive resin is an epoxy resin that results from the polymerization of one or more prepolymers comprising an epoxy unit, the polymerization taking place with a crosslinking agent of the Lewis acid type complexed with an organic compound that is an electron-pair donor.

2. A material according to claim 1, in which the crosslinking agent is an amine-Lewis acid complex.

3. A material according to claim 1, in which the epoxy resin results from the polymerization of one or more epoxy prepolymers comprising a bisphenol A unit, a bisphenol F unit, a diglycidyl ether unit, a novolac unit or a combination thereof.

4. A material according to claim 3, in which the epoxy prepolymer comprising a bisphenol A unit represented by formula I:

5. A material according to claim 3, in which the epoxy prepolymer comprising a bisphenol F unit represented by formula II:

6. A material according to claim 3, in which the epoxy prepolymer comprising a diglycidyl ether unit represented by formula III:

7. A material according to claim 3, in which the epoxy prepolymer comprising a novolac unit represented by formula IV:

in which n is an integer ranging from 0 to 5.

8. A material according to claim 3, in which the epoxy resin results from the polymerization of at least two epoxy prepolymers selected from the group consisting of an epoxy prepolymer comprising a bisphenol A unit represented by formula I:

in which n is an integer ranging from 0 to 12.

in which n is an integer ranging from 0 to 12;

epoxy prepolymer comprising a bisphenol F unit represented by formula II:

an epoxy prepolymer comprising a diglycidyl ether unit represented by formula III:

and an epoxy prepolymer comprising a novolac unit represented by formula IV:

in which n is an integer ranging from 0 to 5.

9. A material according to claim 3, in which the epoxy resin results from the polymerization of epoxy prepolymer comprising a bisphenol A unit represented by formula I:

in which n is an integer ranging from 0 to 12
epoxy prepolymer comprising a diglycidyl ether unit represented by formula III:

III

10. A material according to claim 1, in which the oligoaniline is an aniline tetramer.

11. A material according to claim 1, comprising a dopant represented by formula V:

V in which:
R$^1$ represents —SO$_3$H or PO$_3$H$_2$;
R$^2$ is a linear or branched alkyl group and m is equal to 1 or 2; or
R$^2$ is a group represented by formula VI:

VI in which R$^1$ is such as defined above and n is an integer ranging from 1 to 16, and m is equal to 1.

12. A material according to claim 1, in which said oligoaniline is a compound represented by:

13. A method for manufacturing a material such as defined in claim 1, comprising:
a) mixing a prepolymer of the adhesive resin, an oligoaniline comprising from 4 to 30 repeat units, an organic solvent, a dopant and optionally a crosslinking agent in the form of a Lewis acid complexed with an organic compound that is an electron-pair donor;
b) evaporating at least part of the organic solvent;
c) adding a crosslinking agent when this is not present in said mixing, said agent being a Lewis acid complexed with an organic compound that is an electron-pair donor; and
d) crosslinking said mixture at a suitable temperature to obtain a material having a resistivity ranging from $10^5$ to $10^7$ Ω·cm,
the order possibly being a), b), c) and d) or a), c), b) and d), c) not existing when the crosslinking agent is present in a).

14. A method according to claim 13, in which the organic solvent is a solvent that has an evaporation temperature below the crosslinking temperature.

15. A method according to claim 13 or 14, in which the organic solvent is tetrahydrofuran or ethyl acetate.

16. A method according to claim 13, in which the crosslinking agent has an activation temperature below 80° C.

17. A method according to claim 16, in which the crosslinking agent is an amine-BX$_3$ complex, X corresponding to a halogen atom.

18. A method according to claim 17, in which the crosslinking agent is a chlorobenzylamine-BF$_3$ complex.

19. A method according to claim 13, in which said crosslinking is carried out at a crosslinking temperature below 80° C.

20. A method according to claim 13, further comprising, before said crosslinking, depositing the mixture onto a substrate in the form of a film, a bead, a joint or an array of studs.

21. A method according to claim 13, in which the crosslinking agent has an activation temperature not greater than 50° C.

* * * * *